Nov. 16, 1948.    R. J. TEETSELL    2,453,734
METER PEDESTAL
Filed March 10, 1944

INVENTOR.
ROY J. TEETSELL
BY
William D. Hall
ATTORNEY

Patented Nov. 16, 1948

2,453,734

UNITED STATES PATENT OFFICE 2,453,734

METER PEDESTAL

Roy J. Teetsell, Red Bank, N. J.

Application March 10, 1944, Serial No. 525,961

3 Claims. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to electrical metering devices, and more particularly to mounts to be used in connection with testing and calibrating meters of the panel type.

In calibrating electrical meters, it is important that they be calibrated in the position in which they will be used. The usual steps taken in calibrating a meter are to place a meter on a table or clamp it in a jig or vise, running leads to a meter standard unit and making a direct comparison between the two. This is a process which takes some time in connecting leads to the meter, and there exists the danger of coming in contact with the supply leads if high potentials are being used.

It is therefore the principal object of my invention to provide a device which allows for calibration of an electrical meter at any angle from horizontal to vertical, said device effecting safety by eliminating the possibility of accidental contact with electrical leads.

It is another object to provide a meter mounting which will accommodate various sized panel type meters with various sized terminals, and which provides rapid and positive mechanical and electrical connections and permits the operator to disassemble the meter's moving parts and make repairs on same.

A feature of this invention is that it permits the calibration of the meter assembled and in operative position on a standard steel panel.

The invention consists of an insulated inclosure or box having slots in which the meter terminals are inserted. Vise-like contacts within the inclosure make mechanical and electrical contact with the meter terminals and allow for electrical tests and calibration without the usual separate operations of removing the meter from a jig or vise and making separate connections.

The invention will be better understood by reference to the attached drawing in which.

Figure 1:
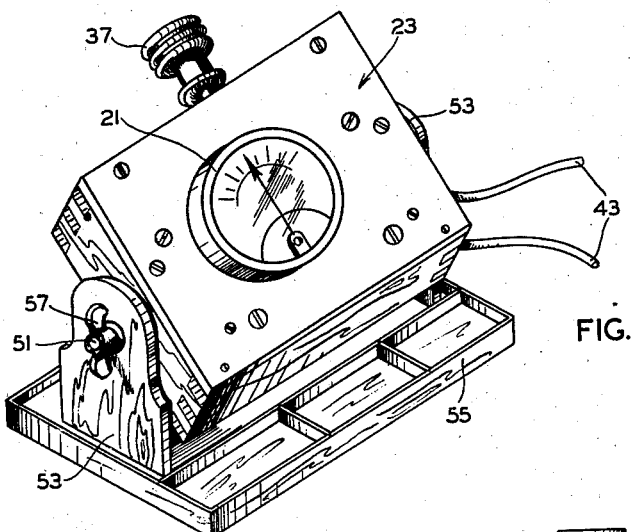
Figure 1 is an isometric view of the meter pedestal assembly with a meter inserted.

Reference is now made to the meter pedestal assembly as shown in Figure 1. A hollow insulated box designated generally by reference numeral 23 is pivotally mounted on threaded rods 51 which are secured to the lateral walls of box 23 and pass through brackets 53 which are in turn mounted upon a base 55. The latter is provided with small compartments for holding small meter parts used for repairing meters. Wing nuts 57 are threaded on rods or shafts 51 and when tightened, clamp the box in any position from vertical to horizontal. Any panel type meter 21 is inserted and removed by pressing on knob 37. Electrical leads 43 enter the insulated box in the back side and are connected to a meter standard unit or other electrical circuit at their other extremity.

Figure 2:
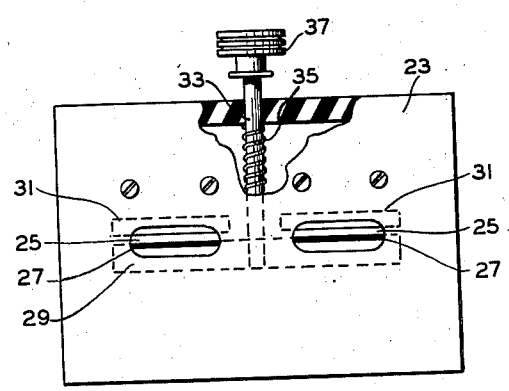
Figure 2 is a front view of the panel of the pedestal of Figure 1, partially broken away to show part of the interior construction of the device.

For a better understanding of the apparatus involved, reference is had to Figure 2. The front of box 23 is provided with an insulating panel such as bakelite in which are cut slots 25 to receive the terminals of various sized meters. In the preferred embodiment, two external leads 43 are connected respectively to the two metal contacts 27 and to the two stationary metallic knife edges 31. The flat meter contacts 27 are mounted, by means of rivets or any other suitable means, upon a bakelite bar 29 which is capable of vertical movement, said vertical movement being obtained through the agency of rod 33 and knob 37 in the embodiment described herein. A helical spring 35, under tension, is coiled around the rod 33, its upper end being secured to the box 23 and its lower end to said rod. Said spring 35 normally holds the knob and rod in its uppermost position so that the knife edges 31 are in contact with the flat contacts 27, and the knob 37 must be forced down in order to insert the meter. When a meter 21 is inserted and pressure released from the knob, the meter terminals are securely clamped between the metal contacts 27 and knife-edges 31. To provide mechanical rigidity and proper alignment for restricting bar 29 and rod 33 to vertical movement, aligning rods can be placed through vertical holes drilled in insulating member 29. These aligning rods, not shown in the drawing for simplicity, can be mounted in fixed position relative to the front panel of the box.

Figure 3:
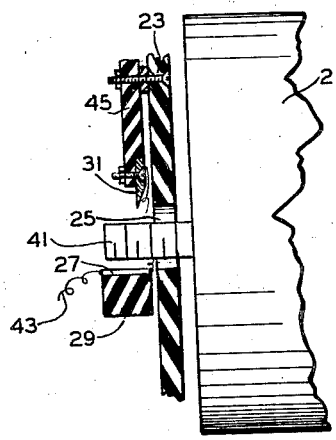
Figure 3 is a sectional view of a detail of the meter contacts characteristic of this invention, showing the parts as the meter is being put into place.

Figure 3 is a sectional view, taken in a vertical plane, showing further detail of the parts described in connection with Figure 2. Numeral 41 indicates one terminal of the meter 21 to be tested or calibrated. This view shows said meter terminal in position so as to be clamped between one of the flat contacts 27 and one of the knife edges 31, the latter two elements being electrically connected together and to one of the external leads 43. It will be readily understood that the use of two meter contacts on each meter terminal will lower the contact resistance. This is advantageous when microammeters are being calibrated. The knife edge is mounted in fixed relationship to the meter box 23 by an insulating member 45 which is rigidly secured to said box 23. The knife edge 31 is secured to the member 45, which may be "Bakelite" or the like, by rivets or in any other suitable manner.

From the above description it is apparent that to calibrate a meter, it is merely necessary to connect the electrical leads to a meter standard and insert the meter in the slots provided on the panel of the device. Comparisons are made between the meter and the standard unit, and proper meter adjustments are made accordingly. If the meter is to be used in a position other than vertical, the meter mount can be clamped at any angle as described.

Although I have shown and described certain specific embodiments of my invention, I am fully aware that many modifications thereof are possible and such modifications are intended to be covered in the appended claims.

I claim:

1. A meter pedestal for meters having two spaced terminals comprising a base, an enclosed box of nonconducting material mounted upon said base, one wall of said box having two elongated apertures, two elongated knife-edge contacts within said box and respectively disposed behind said apertures, a bar of insulating material carrying two elongated flat contacts within said box and respectively disposed behind said apertures and respectively opposing said knife-edge contacts, a rod extending through a wall of said box and provided with a knob outside said box and attached to the bar aforesaid inside said box, spring means urging the flat contacts toward the knife-edge contacts respectively, two electrical leads extending from outside the box respectively to each pair of opposing contacts, the flat contacts being movable away from the knife-edge contacts upon movement of the knob whereby meter terminals of various spacings may be mechanically and electrically gripped by said contacts.

2. An instrument pedestal unit for testing meters having back terminals, comprising in combination, a base, brackets erected on said base having holes transversely therethrough aligned with one another, shaft means disposed in said holes, a hollow insulated box having said shaft means attached to opposing lateral walls thereof to enable it to rotate thereon through a circular arc, a cover panel on one face of said box having aligned elongated open slots therein spaced apart from each other and arranged to permit the facile insertion of the back terminals of an electrical instrument to be tested therethrough into the hollow portion of said box, contact means disposed in said box on the rear face of said panel aligned with said slots but normally arranged to permit the placement of said terminals therethrough, said means including a knife-edge element and flat plate element arranged opposite each other to bite on said terminals mechanically and electrically and having one of said elements stationary while the other is moveable in reciprocating relationship thereto to permit the entrance, closing on for said bite and opening for removal of the said terminals therebetween, means attached to the moveable element for reciprocating it on the back of the panel, and handle means connected with means for operating it from a point external to the box, and a resilient member mounted on said means for keeping said elements normally closed on each other and leads to provide electrical connections to said elements.

3. An instrument pedestal unit for testing meters having back terminals, comprising in combination, a rectangular base having upper surface partitions projecting openly to facilitate the testing, brackets erected on said base from the said upper face and having holes transversely therethrough aligned with one another, shafts disposed in said holes, a hollow insulated box having said shafts attached to the opposing lateral walls thereof to enable it to rotate thereon through an arc, a cover panel on one face of said box having aligned elongated slots therein spaced apart from each other and arranged to permit the facile insertion of the back terminals of an electrical instrument to be tested therethrough into the hollow portion of said box, contact means disposed in said box on the rear face of said panel aligned with said slots but arranged to permit the placement of said terminals therethrough, said contact means including a knife-edge element and flat plate element arranged to bite on each of said terminals independently, mechanically and electrically and having one of said elements stationary while the other is moveable in reciprocating relationship thereto to permit the entrance closing on, and removal of the said terminals therebetween, means attached to the moveable element for reciprocating it on the back of the panel, and handle means connected with means for operating it from a point external to the box, and a resilient member mounted on said means for keeping said elements normally positioned with regard to each other, and leads to provide electrical connection to said elements.

ROY J. TEETSELL.

REFERENCES CITED

The following references are of record in the file of this patent:

UNITED STATES PATENTS

| Number | Name | Date |
|---|---|---|
| 220,499 | Seymour et al. | Oct. 14, 1879 |
| 1,357,926 | Baldwin | Nov. 2, 1920 |
| 1,387,814 | Ten Bosch | Aug. 16, 1921 |
| 1,630,592 | Weston | May 31, 1927 |
| 1,660,807 | Norgren | Feb. 28, 1928 |
| 1,680,849 | Blakeslee | Aug. 14, 1928 |
| 1,763,217 | Buys | June 10, 1930 |
| 1,905,452 | Eaton | Apr. 25, 1933 |
| 2,185,562 | Nielsen et al. | Jan. 2, 1940 |
| 2,208,251 | Evans | July 16, 1940 |
| 2,224,958 | Faber | Dec. 17, 1940 |
| 2,241,181 | Bushnell | May 6, 1941 |